(No Model.)

H. R. TAYLOR.
CLAMP FOR WIRE ROPES.

No. 300,408. Patented June 17, 1884.

Witnesses.
H. Monteverde,
Wilmer Bradford

Inventor
Henry R. Taylor
By C. W. M. Smith
Attorney.

UNITED STATES PATENT OFFICE.

HENRY R. TAYLOR, OF SAN FRANCISCO, CALIFORNIA.

CLAMP FOR WIRE ROPES.

SPECIFICATION forming part of Letters Patent No. 300,408, dated June 17, 1884.

Application filed January 25, 1884. (No model.)

*To all whom it may concern:*

Be it known that I, HENRY R. TAYLOR, a citizen of the United States, residing at San Francisco, in the county of San Francisco and State of California, have invented a new and useful Improvement in Clamps for Wire Ropes, of which the following is a specification.

The object of my invention is to provide a means whereby the abrasion or wear upon the wire rope or cable running between grippers or rollers is more nearly reduced to a minimum than has heretofore been possible.

Figure 1:
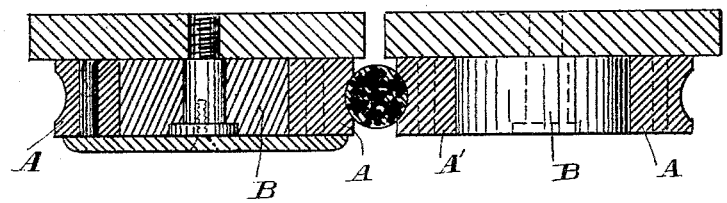
Figure 2:
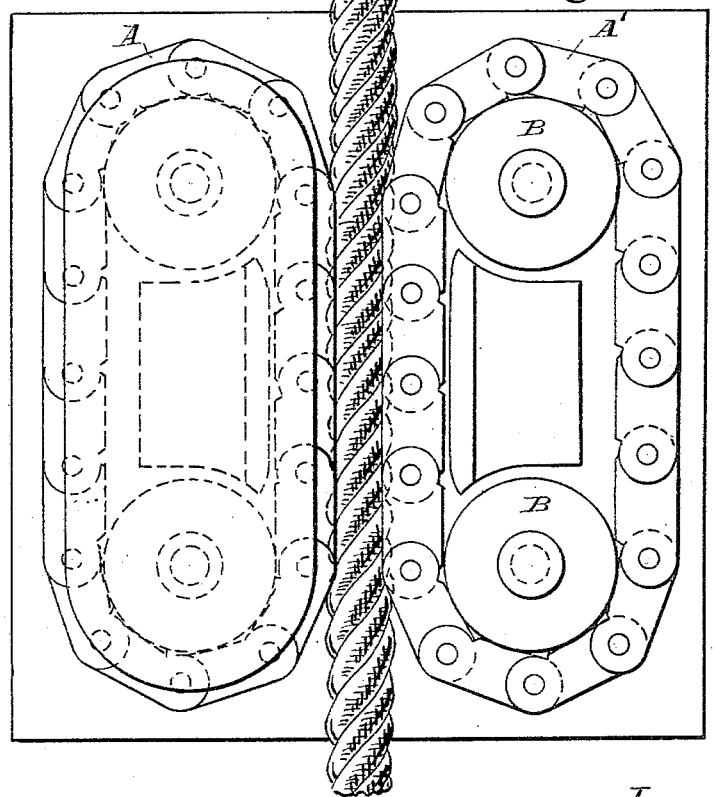

In the accompanying drawings, forming a part of this specification, Figure 1 is a transverse section of the wire-rope cable apparatus, showing one of the pulleys in section. Fig. 2 is an elevation of the same with one side of check-plate removed.

Similar letters refer to similar parts throughout the several cases.

My present invention is an improvement in clamps for wire ropes, for which Letters Patent of the United States were granted to me December 5, 1876, No. 184,995, in which endless chains are employed to fit the surface of the rope, and provide ways within which the said chains are caused to move around blocks.

A and A' represent the endless chains, made in sections, so as to intimately fit together to form the endless band, and not present any angles or projections at the joints that will injure the wire rope. Within the elongated circle or trend described by the endless chains when in action, and at the extreme ends thereof, I place the friction-rollers or pulleys B B, and these rotate on their axes with the endless chains, whereby the friction of the endless rope is more nearly reduced to a minimum than by the use of the fixed guide-pieces in my former invention above referred to, as the chains will move freely and with less friction.

Having thus described my invention, what I claim, and desire to secure by Letters Patent, is—

In combination with traveling or moving clamps for wire ropes, the guiding-rollers or friction-pulleys, constructed, arranged, and operating substantially in the manner and for the purpose herein set forth and specified.

In testimony that I claim the foregoing I have hereunto set my hand and seal.

HENRY R. TAYLOR. [L. S.]

Witnesses:
C. W. M. SMITH,
CHAS. E. KELLY.